US006823072B1

(12) United States Patent
Hoover

(10) Patent No.: US 6,823,072 B1
(45) Date of Patent: Nov. 23, 2004

(54) PEAK TO PEAK SIGNAL DETECTOR FOR AUDIO SYSTEM

(75) Inventor: Alan Anderson Hoover, Indianapolis, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/581,147
(22) PCT Filed: Dec. 8, 1998
(86) PCT No.: PCT/US98/26140

§ 371 (c)(1),
(2), (4) Date: Nov. 16, 2000

(87) PCT Pub. No.: WO99/30534

PCT Pub. Date: Jun. 17, 1999

Related U.S. Application Data

(60) Provisional application No. 60/067,807, filed on Dec. 8, 1997.

(51) Int. Cl.[7] ............................................... H04H 5/00
(52) U.S. Cl. .............................................................. 381/7
(58) Field of Search ................................. 381/1, 2, 7, 8, 381/9, 10, 11, 12, 17, 18, 102, 103, 104, 106, 107, 109, 94.5, 94.8, 57; 348/738

(56) References Cited

U.S. PATENT DOCUMENTS

| 3,979,670 | A | | 9/1976 | Vahaviolos |
| 4,109,198 | A | | 8/1978 | Ueno |
| 4,528,501 | A | * | 7/1985 | Dorrough et al. ............ 324/103 |
| 4,562,476 | A | * | 12/1985 | Shikano et al. .............. 348/365 |
| 4,625,240 | A | * | 11/1986 | Yablouski et al. ........... 358/143 |
| 4,866,774 | A | * | 9/1989 | Klayman ........................ 381/1 |
| 5,175,770 | A | * | 12/1992 | Back ............................ 381/98 |
| 5,363,147 | A | * | 11/1994 | Joseph et al. ................ 348/738 |
| 5,614,851 | A | * | 3/1997 | Holzer et al. .................. 327/58 |
| 6,002,774 | A | * | 12/1999 | Aarts et al. ..................... 381/1 |

FOREIGN PATENT DOCUMENTS

EP 415779 3/1991

* cited by examiner

Primary Examiner—Duc Nguyen
Assistant Examiner—Lun-See Lao
(74) Attorney, Agent, or Firm—Joseph S. Tripoli; Joseph J. Laks; Reitseng Lin

(57) ABSTRACT

A peak to peak detector circuit for use in an audio system comprises a first amplifier having an input terminal for receiving an L+R AC audio signal and an output terminal which is serially coupled to a resistor in series with a capacitor for generating a variable dc voltage having a time vs. amplitude relationship corresponding to the input L+R AC audio signal. A clamping diode having a cathode electrode coupled to a reference potential and having an anode electrode coupled to the capacitor operates to limit negative amplitude excursions associated with the variable dc voltage to a predetermined minimal value. A rectifying diode having a cathode electrode coupled to the anode electrode of the clamping diode, and an anode electrode coupled to a second capacitor to charge the second capacitor responsive to the amplitude of said variable dc voltage operates to produce a dc output signal proportional to the peak to peak amplitude of said L+R audio signal.

15 Claims, 5 Drawing Sheets

PEAK TO PEAK SIGNAL DETECTOR FOR AUDIO SYSTEM

RELATED APPLICATIONS

This application is related to provisional patent application Ser. No. 60/067,807, filed on Dec. 8, 1997 and entitled "PEAK TO PEAK SIGNAL DETECTOR FOR AUDIO COMPRESSOR", the content of which is incorporated herein by reference in its entirety

FIELD OF THE INVENTION

The present invention relates in general to the field of audio systems having signal detection devices for detecting audio signals and more particularly, to a peak-to-peak signal detector for detecting dual channel L+R stereo audio signals.

BACKGROUND OF THE INVENTION

The broadcasting of multichannel or stereo sound programs for television in the United States is in accordance with the system adopted by the Broadcast Systems Television Committee (BTSC) of the Electronic Industries Association (EIA). This television multichannel sound system provides for the transmission of the sum of the left and right stereo audio information (L+R) in a main audio channel in the spectrum space of the television signal formerly occupied by the monophonic audio signal (mono). This was done so that new stereo signals would be compatible with existing monophonic television receiver. Television multichannel sound systems also provide for the transmission of the difference of the left and right stereo audio information (L−R), modulated onto a subcarrier.

The large multichannel sound systems employed in current consumer electronic audio units such as television receivers in combination with loud sound effects recorded on media including high-fidelity VHS video tapes and laser disks contribute to audio signals having wide dynamic range characteristics. Such system dynamic range capability is often an attractive feature in home theater audio/video systems currently on the market and generally contributes to the overall quality and enjoyment of the listener. However, while this may be true in general, sounds consisting of large amplitude transient signals can be disturbing and cause excessive noise. This may be most undesirable in certain instances, such as when children are sleeping. Not surprisingly, under these circumstances, it is desirable to include an automatic dynamic volume control compression system to limit the wide dynamic range performance over a range of audio signals. Accordingly, one must fit accurately detect and track such positive or negative amplitude audio signals in order to perform such dynamic volume control processes.

A peak signal detector may be used to detect a peak amplitude associated with an audio signal and utilized to provide a detector voltage which may then be used to control a volume setting so as to limit the loudness indicative of a high amplitude transient signal. However, audio signals are often asymmetrical. Therefore, examination and detection of only one of the portions of an audio (AC) signal may result in detection of a peak that may be too small (or too large) and thus, not a correct representation of the transient signal amplitude to be detected. That is, if a positive peak detector is used to detect an ac audio signal, then detection of only positive transient signals would occur. For negative excursion transient signals, the positive peak detector would be unable to detect these negative transients, and hence allow the loud signal to be received and companded by the television receiver unit, resulting in an undesirably loud audio signal perceived by the listener. Use of precision rectifiers and amplifiers to detect signal amplitudes of both polarities may be employed to detect both positive and negative going transient ac signals. However, such rectifiers tend to be somewhat complex and require a relatively larger number of electronic components to implement the functions. This is an undesirable characteristic for a circuit which is to be included within a consumer electronic unit, such as a television receiver, in today's highly competitive market. For this reason, television manufactures have been searching for a low cost and highly reliable alternative to accurately detect both positive and negative amplitude audio signals in order to perform dynamic volume control processing for limiting wide dynamic range audio.

SUMMARY OF THE INVENTION

In accordance with the present invention, a peak to peak detector circuit for use in an audio system comprises a first amplifier having an input terminal for receiving an L+R (AC)audio signal and an output terminal which is serially coupled to a resistor in series with a capacitor for generating a variable dc voltage having a time vs. amplitude relationship corresponding to the input L+R AC audio signal. A clamping diode having a anode electrode coupled to a reference potential and having an cathode electrode coupled to the capacitor operates to limit negative amplitude excursions associated with the variable dc voltage to a predetermined minimal value. A rectifying diode having a anode electrode coupled to the cathode electrode of the clamping diode, and an cathode electrode coupled to a second capacitor to charge the second capacitor responsive to the amplitude of raid variable dc voltage operates to produce a dc output signal proportional to the peak to peak amplitude of said L+R audio signal. The detector circuit further comprises a clamping circuit responsive to the voltage value at the cathode electrode of the rectifying diode for clamping the dc output signal at a maximum value.

DETAILED DESCRIPTION OF THE INVENTION

Figure 1:
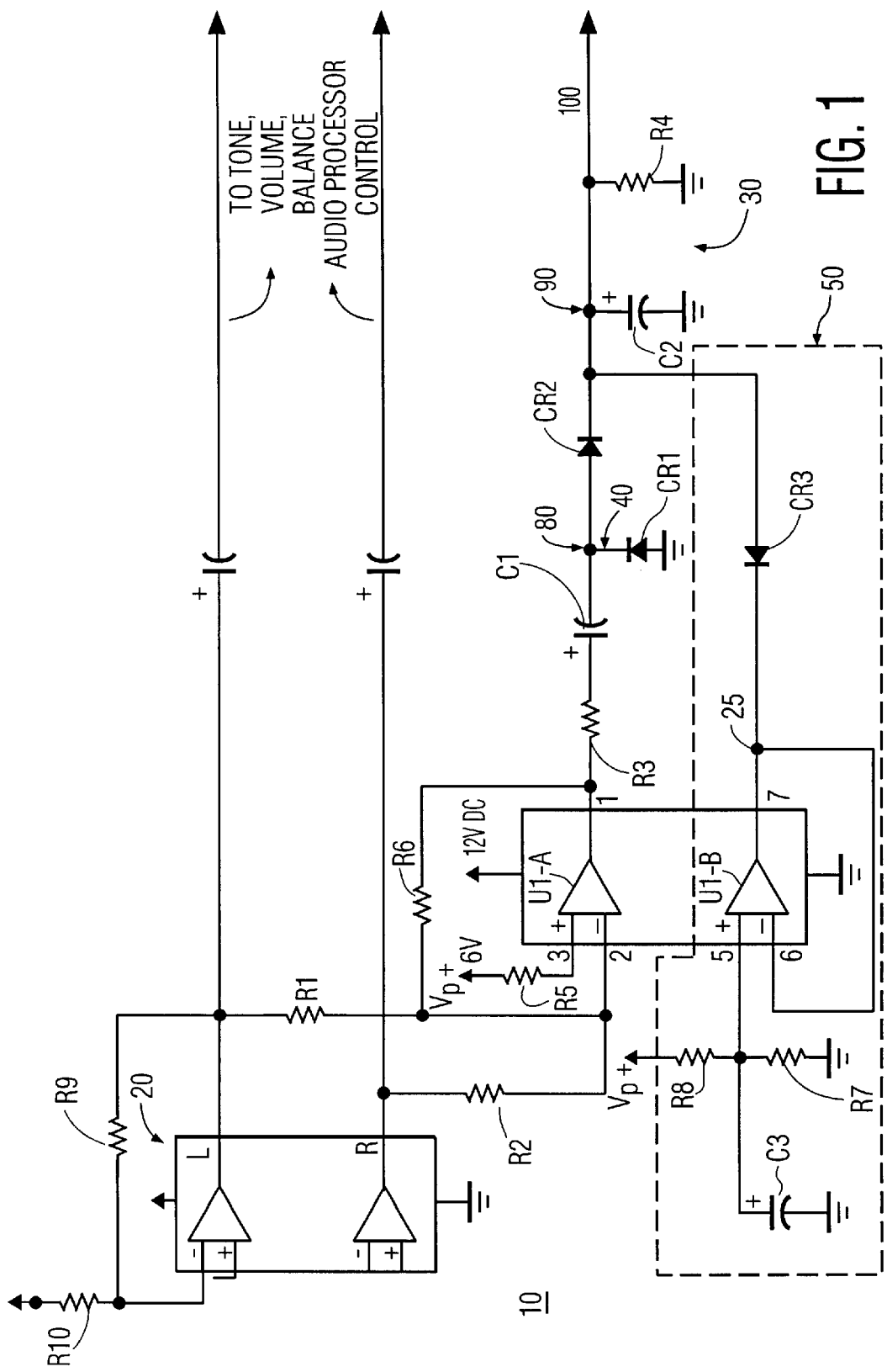
FIG. 1 shows a circuit schematic diagram for a peak to peak detector for an audio system according to the present invention.

FIG. 1 shows a detector circuit 10 according to the present invention for an audio compressor system of a television receiver, such a: the MM101 audio system manufactured by Thomson Consumer Electronics, Inc., the assignee herein. Note that throughout the drawings, like reference numeral are used to indicate like part. Note further that, while FIG. 1 illustrates supply voltages and component values associated with resistive and capacitive circuit elements corresponding to a working embodiment of the detector circuit of the present invention, such values are merely exemplary, and it is understood that a parson skilled in the art may make adjustments to the component values and supply voltages according to the requirements associated with a particular application.

As shown in FIG. 1, the detector circuit 110 is a peak to peak detector which forms a dc output signal 100 at output terminal 90 in response to L+R stereo audio signals components (i.e. AC signal) of a multichannel sound signal output from processor module 20. The amplitude of the dc output signal 100 is proportional to the sum of the peak-to-peak amplitudes of the L and R channel input audio signals. The peak-to-peak detector circuit operates to detect both positive and negative portions of the input L+R AC audio signal, since for many audio waveforms these are asymmetrical. Thus, detector circuit 10 is operative to detect both positive and negative going transients while using a minimal number of electronic components to provide an efficient, low cost detector. The detector output may be sampled by an audio system microprocessor for controlling the setting of the volume control of the audio system.

Still referring to FIG. 1, left (L) and right (R) stereo audio channels are applied to the inverting input or summing input (pin 2) of AC operational amplifier U1-A through resistors R1 and R2, respectively. The noninverting input (pin 3) of amplifier U1-A is coupled to supply voltage $V_c$ via resistor R5. The output signal at output terminal 1 of amplifier U1-A consists of the inverted sum of signals L+R. Resistor R6 is coupled between the output terminal 1 and inverting terminal 2 of amplifier U1-A to provide a negative feedback to the amplifier for linear operation. The output terminal 1 is also coupled to a first terminal of resistor R3, whose second terminal is coupled to a positive terminal of capacitor C1. That is, resistor capacitor combination R3 and C1 are serially coupled to one another. Clamping diode CR1 has the cathode electrode coupled to the negative te of capacitor C1 and the anode electrode coupled to reference or ground potential. The (L+R) signal is passed tough resistor R3 and capacitor C1, where it is clamped by diode CR1. The clamping circuit consisting of the RC combination of R3 and C1 and clamping diode CR1 operates to force the L+R negative portion of the signal to always operate at one diode drop below the reference potential (i.e. ground potential). As illustrated, the (L+R) signal at node 80 is now a variable dc signal, having substantially the same time vs. amplitude relationship as the original audio signal, as viewed on an oscilloscope, except for the dc offset. The signal at node 80 has a um voltage of approximately –0.6vdc (corresponding to one diode voltage drop) and a maximum voltage of the peak-to-peak amplitude of the L and R signal minus the aforementioned diode drop. This limits negative amplitude excursions associated with the variable dc voltage sign 40 to a predetermined minimal value of –0.6v.

Diode CR2 is coupled between the clamping circuit arrangement of diode CR1 at node 80 and the dc detector output at node 90 which forms a time constant circuit 30 comprising capacitor C2 and resistor R4 in parallel. The variable dc signal 40 at node 80 passes through diode CR2 and charges capacitor C2 when the voltage at node 80 exceeds the voltage at node 90 by one diode drop. The time constant associated with the charging of capacitor C2 is determined largely by the value of resistor R3. When the incoming audio signal L+R becomes zero amplitude, the capacitor begins to discharge through resistor R4 according to the time constant R2×C4. In order to respond rapidly to positive or negative transients in the L+R signal, the charge time of capacitor C2 should be considerably less than the discharge time of C2. Accordingly, the resistor values associated with R3 and R4 are chosen such that resistor R4 is considerably larger than the corresponding value associated with resistor R3. Such resistor values give the detector a "fast attack/slow decay" characteristic, typical of many audio detectors. While numerous resistor/capacitor combinations may be used according to particular system requirements, in the preferred embodiment, a 20:1 ratio of resistor values (R4/R3) is preferred. Note that the discharge time of capacitor C2 is also determined by the input impedance of microprocessor 110 which is typically very high, relative to resistor R4. Thus, resistor R4 represents the dominant discharge impedance.

Figure 3:
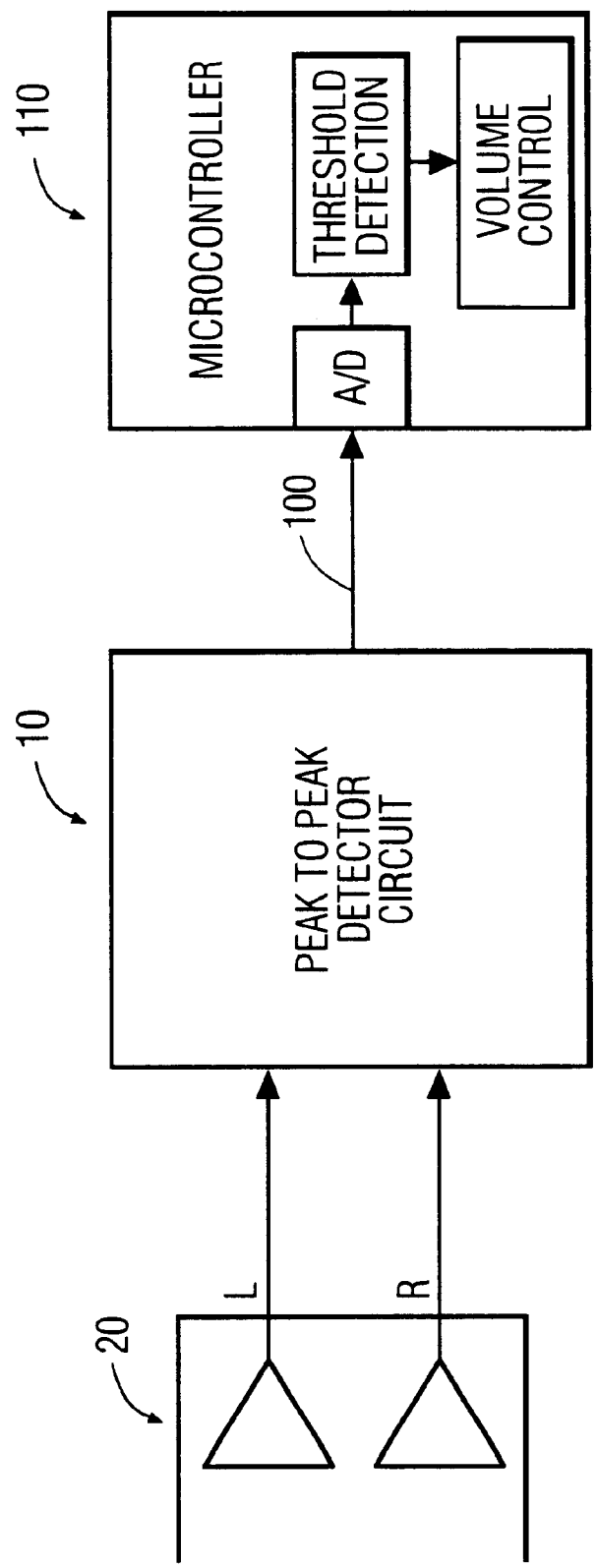
FIG. 3 depicts a block diagram of a volume control system employing the peak to peak detector circuit of FIG. 1 according to the present invention.

Referring to FIG. 1 in conjunction with FIG. 3, the limited fast-attack/slow-decay dc detector voltage 100 may be applied to the analog to digital converter (A-to-D) input of audio system microprocessor 110. Clamping circuit 50 (FIG. 1) comprising unity gain operational amplifier U1-B and diode CR3 operates to limit or clamp the maximum amplitude of dc output signal 100 at a predetermined upper boundary. The voltage output at pin 7 of amplifier U1-B is determined by the voltage at its noninverting input (pin 5). This voltage is generated as a result of R7 and R8 voltage divider for dividing the dc power supply voltage $V_p$ between the two resistors. Capacitor C3 operating in parallel with resistor R7 acts as a filter. The output voltage of amplifier U1-B at pin 7 is therefore fixed according to its input voltage at pin 5, thus providing a constant voltage at node 25. Clamping diode CR3 has the cathode electrode connected to output pin 7 and the anode electrode connected to the cathode of CR2 art detector output terminal 90. This arrangement operates to clamp or limit the detector output voltage at a maximum value corresponding to the voltage at pin 7 (i.e. node 25) plus the diode drop across diode CR3. That is, when the detector voltage at node 90 reaches the output voltage of amplifier U1-B B plus one diode voltage drop, diode CR3 conducts. Since amplifier U1B is a low impedance, device, the detector output is effectively limited. In the preferred embodiment, the detector output voltage amplitude is limited to approximately 5V by the clamping circuit consisting of the amplifier U1-B and related circuitry. In this embodiment, the output of U1-B is fixed at approximately 4.3V dc so that when the detector voltage at node 90 reaches the amplitude of 4.3V dc plus one diode drop, diode CR3 conducts. In this manner, clamping circuit 50 may operate to protect the A/D converter within microprocessor 110 which operates on 5 volts dc power supply. Since it may be undesirable for the A/D converter to accept an input signal exceeding the 5 volt operating voltage, the clamping circuit functions to limit the output detector voltage to a voltage not greater than the operating voltage of the processor operative to receive the output DC signal 100.

Referring to FIG. 3, the A/D converter samples the dc detector voltage signal 100 within a predetermined time interval range between 3–10 msec. The microprocessor then uses the sampled input to make processing decisions based on the sampled detector voltage amplitude. The processor uses these decisions to control the volume setting of the microcomputer-controlled volume control of the audio system such as the MM101 audio system. That is, the processor compares the absolute amplitude of the sampled dc signal voltage 100 with a predetermined threshold and will decrease or adjust the volume control in proportion to the relative difference.

As previously mentioned, peak-to-peak detection is used in order to detect both the positive and negative portions of the ac audio signal, since for many audio waveforms the amplitudes are asymmetrical. Note that with respect to the detector circuit of FIG. 1, if a positive going transient is output from amplifier U1-A at pin 1, the positive going transient will rapidly forward bias diode CR2. Similarly, capacitor C2 will charge rapidly if the positive going pulse has a high amplitude and hence, detection of the positive going transient pulse occurs in a relatively short time period. When capacitor C2 is fully discharged, if a negative going transient pulse is output at pin of amplifier U1-A, diode CR2 would not conduct as the voltage at node 80 does not exceed the voltage at node 90. Accordingly, the detector does not respond immediately to the negative going transient by charging capacitor C2. Instead, diode CR1 will conduct, and capacitor C1 begins to charge. Accordingly, detection of negative going transients requires an L–R waveform signal of sufficient period of time to charge up capacitor C1 to permit the detector output to produce a dc signal amplitude proportional to the peak to peak amplitude of the L+R signal.

Figure 2A:
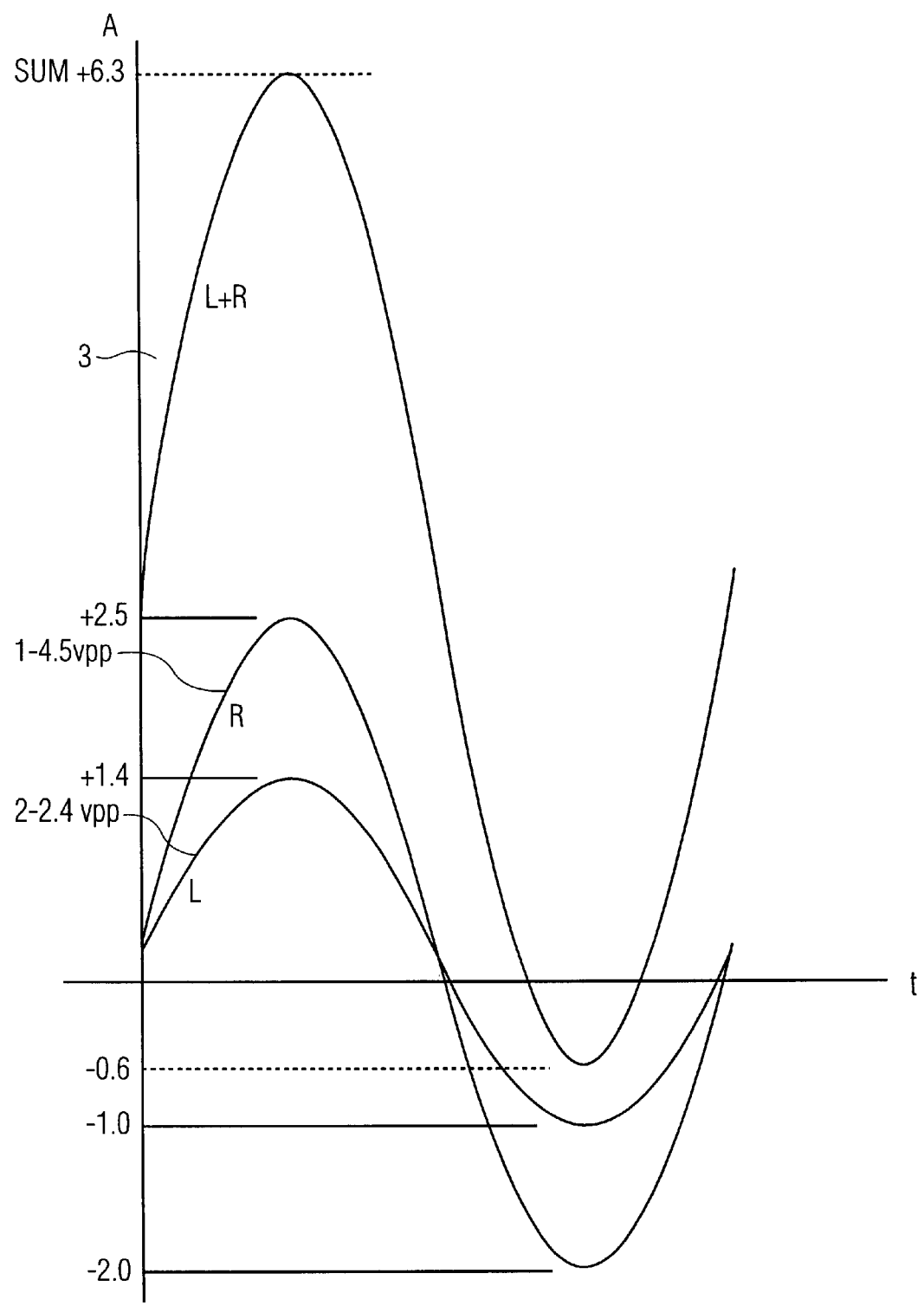
FIGS. 2A–C illustrate various waveforms resulting from the operation of the circuit of FIG. 1 and depicting the input L and R audio signal amplitudes and dc output voltages associated with the summed L and R audio signals.
Figure 2B:
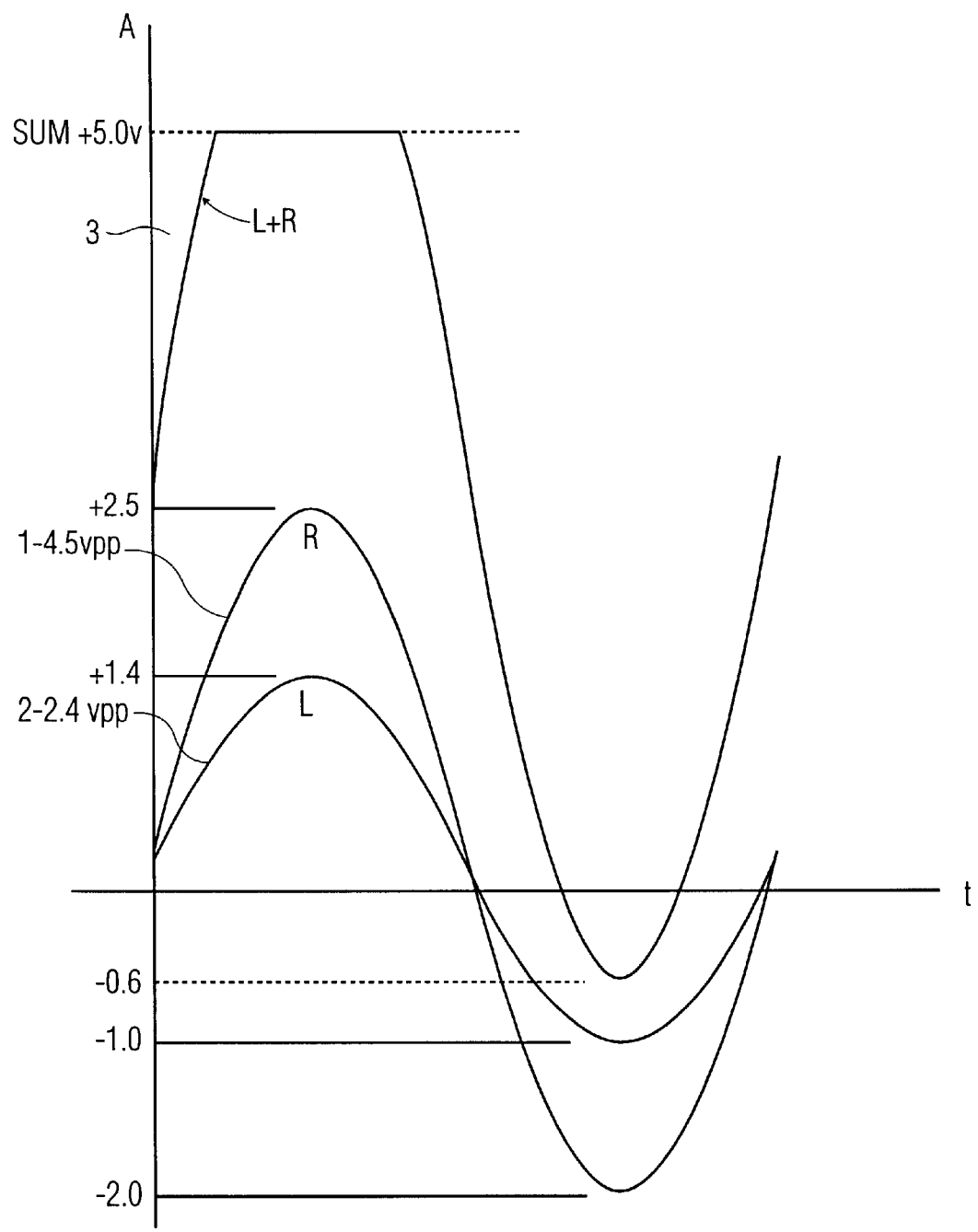
Figure 2C:
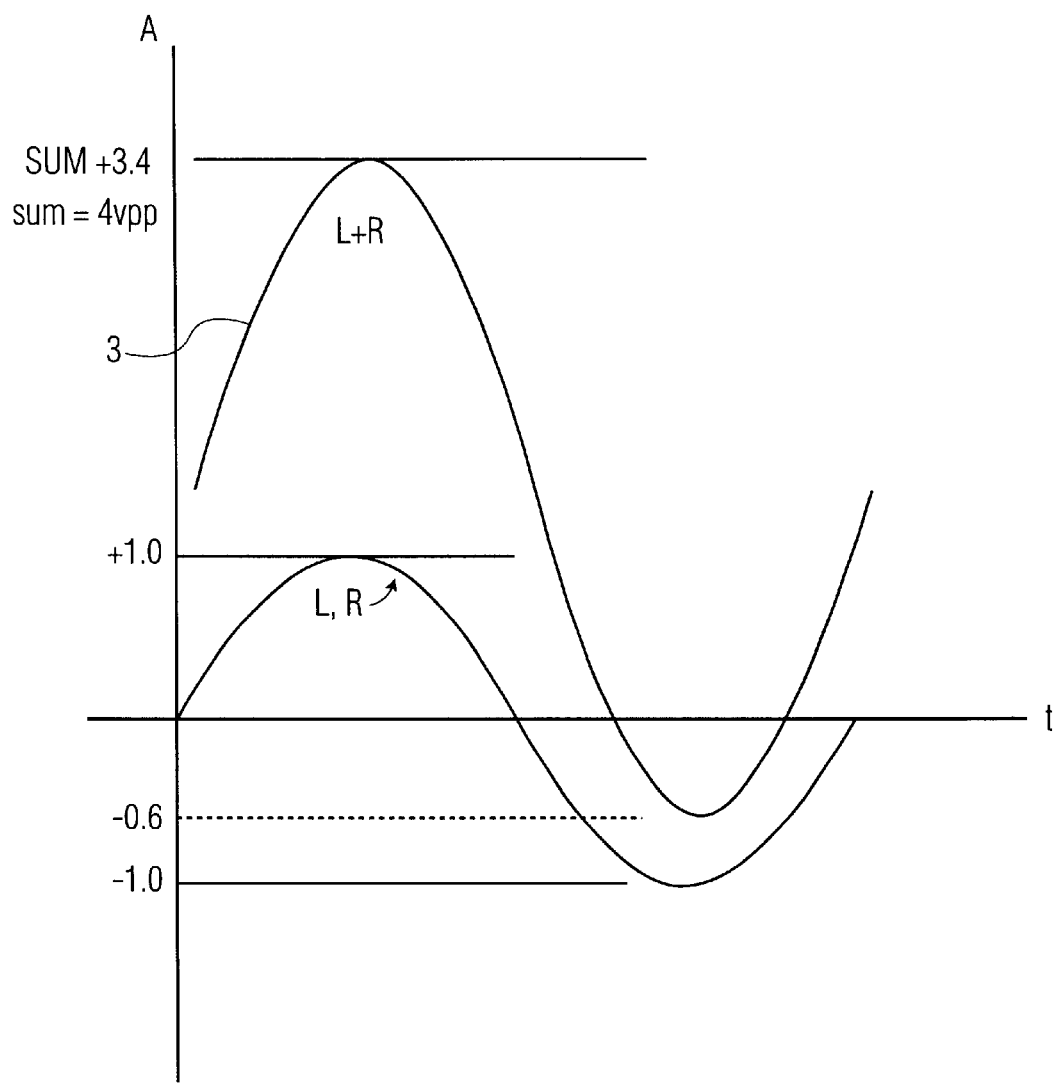

FIGS. 2A, 2B, and 2C represent exemplary waveform diagrams illustrative of the above-described detector processing. Referring now to FIG. 2A in conjunction with FIG. 1, waveform 1 depicts a 4.5 volt peak to peak signal with a 2.5 volt dc offset. Waveform 2 is a 2.4 volt peak to peak signal with a 0.2 dc offset. These signals are indicative of the right and left (R and L) stereo audio channel signals respectively, The variable dc signal output at node 80 (see FIG. 1) is indicated by each of the waveforms depicted as waveform #3. This is the sun of the peak to peak voltages of waveforms #1 and #2. Waveform #3 of FIG. 2A represents the dc variable voltage at node 80 with the limiting circuit 50 disabled. Therefore, the positive peak voltage of the sum is +6.3v while the negative peak voltage goes down to –0.6v. FIG. 2B illustrates the same set of waveforms shown in FIG. 2A, this time with the +5v limiting circuit 50 of FIG. 1 enabled. In this cue, the peak of the summed L+R signal waveform #3 is shown clipped at 5.0v peak with a 5.6v peak to peak voltage. The clamping circuit of CR1 operates to produce a minimum voltage level of –0.6v as also seen in FIG. 2A.

FIG. 2C illustrates a second pair of input waveform indicative of the left and right stereo audio channel signals where each signal is an identical 2v pea to p signal having no dc offset. The L+R summed signal waveform #3 is thus a 4v peak to peak signal, having peak values at +3.4v and –0.6v. While not illustrated in FIGS. 2A, 2B, 2C, one can ascertain that the dc amplitude values at node 90 are represented by the positive peak value of the summed waveforms 13 less the 0.6v diode drop across diode CR2.

Note that in operation within a volume control system of an audio device such as a television receiver, as shown in FIG. 3, the peak to peak detector outputs the dc voltage signal at an output terminal which is connectable to a processor such as a microcontroller having an A/D converter for converting the dc output signal to a series of digital samples. The processor operates in response to these digital samples to control the volume so as to eliminate the high amplitude transient signal characteristics associated with a loud audio L+R signal such as an explosion, a cannon shot, gun firing and the like. Compression of this signal occurs via software controls of the digitally controlled volume controller.

Note that the detector circuit described herein may be used in a variety of audio systems which include television receivers used in display devices (commonly known as television sets) as well as television receivers without a display device such as a VCR. It is also noted that some FM radios have the capability of receiving and reproducing television sound signals. As such, the peak to peak detector embodied in the preset invention may be used in such FM radios as input to a processor for controlling the volume in response to the peak to peak amplitudes of the left and right stereo audio channel signals.

What is claimed is:

1. A peak to peak detector circuit for use in a television receiver, the circuit comprising: means for receiving left (L) and right (R) stereo audio channel signals and forming an L+R audio signal indicative of the sum of the left and right stereo audio channel signals; clamping means responsive to said L+R audio signal for generating a variable dc signal having a time and amplitude relationship corresponding to said L+R audio signal, wherein said clamping means limits a minimum amplitude associated with said variable dc signal to a predetermined minimal value; and rectifying means responsive to said variable dc signal for generating a dc output signal having an amplitude proportional to the peak to peak amplitude of said L +R audio signal, wherein said clamping means comprises a summing amplifier having an input terminal for receiving said L+R audio signal and an output terminal coupled to a first terminal of a resistor, a capacitor having first and second terminals, said first terminal coupled to a second terminal of said resistor, and said second terminal coupled to the cathode electrode of a diode; and wherein said rectifying means includes a second capacitor coupled between a second diode and a reference potential, wherein when said second diode conducts, said second capacitor is charged according to said dc output signal; and wherein said rectifying means further includes a second resistor in parallel with said second capacitor to form a discharge circuit operative to discharge said detector circuit according to a given discharge time value when said L+R audio signal is of substantially zero amplitude.

2. The detector circuit according to claim 1, wherein said second capacitor is charged according to a given charging time value.

3. The detector circuit according to claim 2, wherein said discharge time value is substantially greater than said charging time value.

4. The detector circuit according to claim 1, further comprising second clamping means for limiting a maximum amplitude associated with said output dc signal to a predetermined maximum value corresponding to a voltage not greater than an operating voltage of a processor operative to receive said output dc signal.

5. The detector circuit according to claim 4, wherein said second clamping means includes an amplifier for producing a constant output voltage at an output terminal, and a third diode having a cathode electrode coupled to said amplifier output terminal, whereby said third diode conducts through said amplifier to limit the maximum voltage amplitude associated with said output dc signal when the voltage at the anode electrode of said third diode exceeds said amplifier output voltage by a given amount.

6. The detector circuit according to claim 5, wherein said given amount corresponds to the voltage drop across said third diode.

7. A peak to peak detector circuit for use in an audio system comprising:

a first amplifier having an input terminal for receiving an L+R AC audio signal and an output terminal which is serially coupled to a resistor in series with a capacitor for generating a variable dc voltage having a time vs. amplitude relationship corresponding to said input L+R AC audio signal;

a clamping diode having an anode electrode coupled to a reference potential and having a cathode electrode coupled to said capacitor to limit negative amplitude excursions associated with said variable dc voltage to a predetermined minimal value; and a rectifying diode having an anode electrode coupled to said cathode electrode of said clamping diode, and a cathode electrode coupled to a second capacitor to charge said second capacitor responsive to the amplitude of said variable dc voltage to produce a dc output signal proportional to the peak to peak amplitude of said L+R audio signal; and a limiting circuit responsive to the voltage value at the cathode electrode of said rectifying diode for clamping said dc output signal at a maximum value.

8. The detector circuit according to claim 7, wherein said maximum voltage value corresponds to a voltage not greater than an operating voltage of a processor operative to receive said output dc signal.

9. The detector circuit according to claim 7, wherein said limiting circuit comprises a second amplifier coupled to a second clamping diode.

10. The detector circuit according to claim 9, wherein said second amplifier is operative for generating a constant voltage at an output terminal, said second clamping diode having a cathode electrode coupled to said second amplifier output terminal and an anode electrode coupled to the cathode electrode of said rectifying diode, whereby said second clamping diode conducts through said second amplifier to limit the maximum amplitude associated with said output dc signal when the voltage at the cathode electrode of said rectifying diode exceeds said amplifier output voltage by the voltage drop across said second clamping diode.

11. The detector circuit according to claim 7, wherein a charging time associated with said second capacitor is determined according to parametric values associated with said resistor and said second capacitor.

12. A volume control system for controlling the level of an L+R stereo audio signal comprising:

a peak to peak detector circuit including means for receiving said L+R stereo audio signal and generating a signal corresponding to an inverted L+R stereo audio signal; a clamping circuit responsive to said L+R audio signal for generating a variable dc signal having a time and amplitude relationship corresponding to said L+R audio signal, wherein said clamping circuit limits a negative excursion of said variable dc signal to a minimum voltage value; and rectifying means responsive to said variable dc signal for generating a dc output signal having an amplitude proportional to the peak to peak amplitude of said L+R audio signal;

a processor responsive to said output dc signal for comparing the amplitude associated with said output dc signal with a threshold value to determine a difference value, and adjusting the amplitude associated with said L+R stereo audio signal according to the difference value; and wherein said peak to peak detector circuit further includes a limiter circuit for limiting a positive excursion of said output dc signal to a maximum voltage value.

13. The volume control system according to claim 12, wherein said processor comprises a microcomputer having an analog to digital converter for sampling said output dc signal at predetermined time intervals and a compressor for adjusting the amplitude associated with said L+R stereo audio signal according to the difference value.

14. The volume control system according to claim 13, wherein said maximum value corresponds to a voltage not greater than an operating voltage of said analog to digital converter operative to receive said output dc signal.

15. The volume control system according to claim 12, wherein said minimum voltage associated with said variable dc signal is substantially −0.6 volts.

* * * * *